United States Patent
Baumann et al.

(10) Patent No.: US 7,774,910 B2
(45) Date of Patent: Aug. 17, 2010

(54) INDEPENDENT AXIS CLAMPING APPARATUS AND METHOD

(75) Inventors: John A. Baumann, St. Charles, MO (US); Herb Bommer, St. Peters, MO (US); Kurt A. Burton, Wildwood, MO (US); Mike P. Matlack, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 291 days.

(21) Appl. No.: 11/771,188

(22) Filed: Jun. 29, 2007

(65) Prior Publication Data

US 2008/0084018 A1 Apr. 10, 2008

Related U.S. Application Data

(60) Provisional application No. 60/849,689, filed on Oct. 5, 2006.

(51) Int. Cl.
*B25B 5/16* (2006.01)
(52) U.S. Cl. .................... 29/271; 29/281.1; 269/71
(58) Field of Classification Search .......... 29/281.1, 29/251, 243.5; 269/71, 73, 60
See application file for complete search history.

(56) References Cited

U.S. PATENT DOCUMENTS

| | | | |
|---|---|---|---|
| 4,932,280 A | | 6/1990 | Becker et al. |
| 5,343,603 A | * | 9/1994 | Pioch .......................... 29/27 C |
| 5,893,507 A | | 4/1999 | Ding et al. |
| 5,964,016 A | * | 10/1999 | Ito et al. ...................... 29/27 C |
| 6,185,818 B1 | * | 2/2001 | Ito et al. ...................... 29/889.7 |
| 6,199,745 B1 | | 3/2001 | Campbell et al. |
| 6,254,075 B1 | * | 7/2001 | Kozima ........................ 269/73 |
| 6,305,678 B1 | * | 10/2001 | Hammersmith et al. ....... 269/71 |
| 6,389,698 B1 | * | 5/2002 | Malatier ..................... 29/897.2 |
| 6,539,600 B2 | * | 4/2003 | Wu et al. ...................... 29/252 |
| 6,546,609 B1 | * | 4/2003 | Lee et al. .................. 29/243.53 |
| 6,634,072 B2 | * | 10/2003 | Ohmori et al. .............. 29/26 A |
| 6,874,773 B1 | * | 4/2005 | Newbould .................... 269/63 |
| 7,076,851 B2 | * | 7/2006 | Rousset ....................... 29/252 |
| 7,168,694 B2 | * | 1/2007 | Bui et al. ...................... 269/63 |
| 7,290,760 B1 | * | 11/2007 | Lindsay et al. ................ 269/75 |
| 2005/0092817 A1 | | 5/2005 | Baumann et al. |
| 2006/0237888 A1 | | 10/2006 | Burton et al. |

OTHER PUBLICATIONS esp@cenet—Bibliographic data.htm. This link is to a patent describing a "Dual Arm Apparatus With Co-Axial Drive Shafts". Two drive motors are each coupled to one of the shafts through a drive belt arrangement. This is the basic approach used by ESAB (http://www.esabcutting.com/) in their embodiment of a "bobbin tool" FSW system, where two separate are coupled with the drive shafts using gear-toothed belts.

* cited by examiner

*Primary Examiner*—Lee D Wilson
(74) *Attorney, Agent, or Firm*—Tung & Associates

(57) ABSTRACT

Apparatus for performing operations on a workpiece includes a clamping assembly mounted on a tool support for movement along at least one axis independent of the axes along which the tool moves. The clamping assembly includes clamping devices for applying clamping pressure to the workpiece, and a rotary drive mounted on the tool support for rotating the clamping devices around the independent axis. The clamping devices include clamping packs having a clamping roller mounted on a pneumatically driven slide for applying a programmed amount of clamping pressure to the workpiece.

22 Claims, 10 Drawing Sheets

INDEPENDENT AXIS CLAMPING APPARATUS AND METHOD

CROSS REFERENCE TO RELATED APPLICATIONS

This application claims the benefit of Provisional U.S. Patent Application No. 60/849,689 filed Oct. 5, 2006.

TECHNICAL FILED

This disclosure generally relates to manufacturing tools having integrated clamping fixtures, and deals more particularly with a tool having a workpiece clamp that can be moved along an axis independent of the direction of tool movement.

BACKGROUND

A variety of clamping devices are available for applying clamping force to a workpiece in an area near a manufacturing tool operating on the workpiece. The application of clamping forces near the manufacturing tool may reduce the need for complicated or cumbersome external clamping tools that may be needed in processes such as friction stir welding (FSW), to locate the parts being welded, prevent part separation during welding and react to process loads generated during the welding process.

One clamping device suitable for use with a FSW machine is disclosed in US Patent Application Publication Number 2005/0092817 published May 5, 2005, and assigned to The Boeing Company. In this prior patent application, the clamping device is mounted on a spindle head that carries the FSW tool. The clamping device is constrained to mechanically follow the path of the FSW tool spindle. The spindle head is mounted on a machine tool arm that moves along any of 3 orthogonal axes in which the weld path, and thus the movement of the clamping device, is straight. In some applications, however, complex curvatures of workpieces require more complicated movements of the FSW tool as well as the clamping device. In these more complicated workpiece geometries, the tool path may vary with the changing slope and contours of the workpiece. As a result, the clamping device may not always "track" with the FSW tool to apply clamping force when and where it is required.

Accordingly, there is a need for a workpiece clamping apparatus that is mounted on a common support with a tool, but yet can be moved independently of the tool so that clamping force can be applied at the desired workpiece locations regardless of the orientation of the tool or the support. It would also be desirable to provide a clamping apparatus and related method that coordinates the independent movement of the clamping device with movement of the tool. Embodiments of the disclosure are intended to satisfy these needs.

SUMMARY

Embodiments of the disclosure provide a clamping apparatus that may be mounted on a common support with a tool, such as a spindle housing, but which may be moved independently of the tool in order to closely follow the contour of a workpiece. The clamping apparatus may be mounted on a spindle housing for movement along at least one axis that is independent of the movement of the tool. The apparatus may include clamping rollers that roll along the surface of the workpiece in order to reduce friction, and apply programmable amounts of clamping force to the workpiece.

According to one disclosed embodiment, a manufacturing apparatus is provided, comprising: a spindle support moveable along multiple axes; a tool mounted on the spindle support for performing a manufacturing operation on the workpiece; and, a clamping assembly mounted on the spindle support for movement along at least one axis independent of the movement of the spindle. The clamping assembly includes clamping devices for applying clamping pressure to the workpiece. The clamping assembly may include a rotary drive mounted on the spindle support for rotating the clamping devices around the independent axis. The clamping devices may comprise clamping packs that include a clamping roller mounted on a pneumatically driven slide for applying a programmable amount of pressure to the workpiece. The rotary drive includes a stationary portion secured to the spindle support, and a rotating portion driven by a motorized gear drive.

According to another disclosed embodiment, apparatus is provided for performing operations on a workpiece, comprising: a tool assembly including a tool moveable along multiple axes; and a clamping assembly mounted on the tool assembly, the clamping assembly including at least one clamping device for applying clamping pressure to the workpiece, and means for mounting at least one clamping device for movement along at least a first axis independent of the movement of the tool. The tool assembly may include a spindle support and the mounting means may include a rotary mount for mounting at least one clamping device on the spindle support for rotation around the first axis. The mounting means may further include a slide assembly coupled with rotary mount for mounting the clamping device for movement along a second axis, toward and away from the workpiece. The rotary mount may include a stationary portion secured to the spindle, a rotatable portion, and a motorized drive for driving the second portion relative to the first portion. The motorized drive may include an electric motor and a gear drive coupling the motor with the rotatable portion of the rotary mount. The clamping device may include a roller clamp for engaging workpiece and means for biasing the roller clamp against the workpiece. The biasing means may comprise a fluid driven motor, such as a pneumatic cylinder. The clamping device may include a clamping pack and a releasable connection for releasably securing the clamping pack on the mounting means, thereby permitting the use of interchangeable clamping elements.

According to a method embodiment, manufacturing operations are performed on a workpiece, comprising the steps of: contacting the workpiece with a tool; moving the tool along any of multiple axes; moving a clamp along at least a first axis independent of the movement of the tool; and, clamping the workpiece using the clamp. Contacting the workpiece with the tool may comprise plunging a friction stir welding pin tool into the workpiece while the workpiece is being clamped. The tool may be moved by moving a spindle housing over the workpiece, and the clamp may be moved by rotating the clamp around the first axis as the spindle housing moves over the workpiece. The method may further comprise the step of coordinating the movement of the clamp with the movement of the tool.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
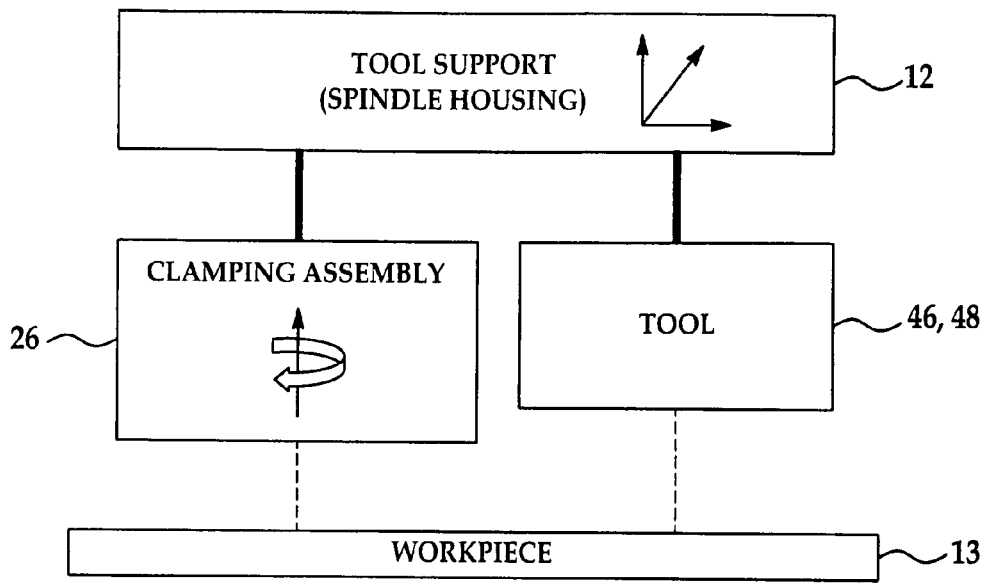
FIG. 1 is a functional block diagram illustrating a friction-stir welding head assembly, including a clamping assembly according to an embodiment.

Referring first to FIGS. 1-7, a FSW head 10 (FIG. 1a) includes a tool support comprising a spindle housing 12 pivotally mounted on a yolk 18 by a pair of mounting arms 24 received in pivots 16 on the yolk 18. The mounting arms 24 form part of a saddle attachment 22 that may be secured to the spindle housing 12. Arms 24 mount the spindle housing 12 for rotation about the "A" axis.

Figure 1A:
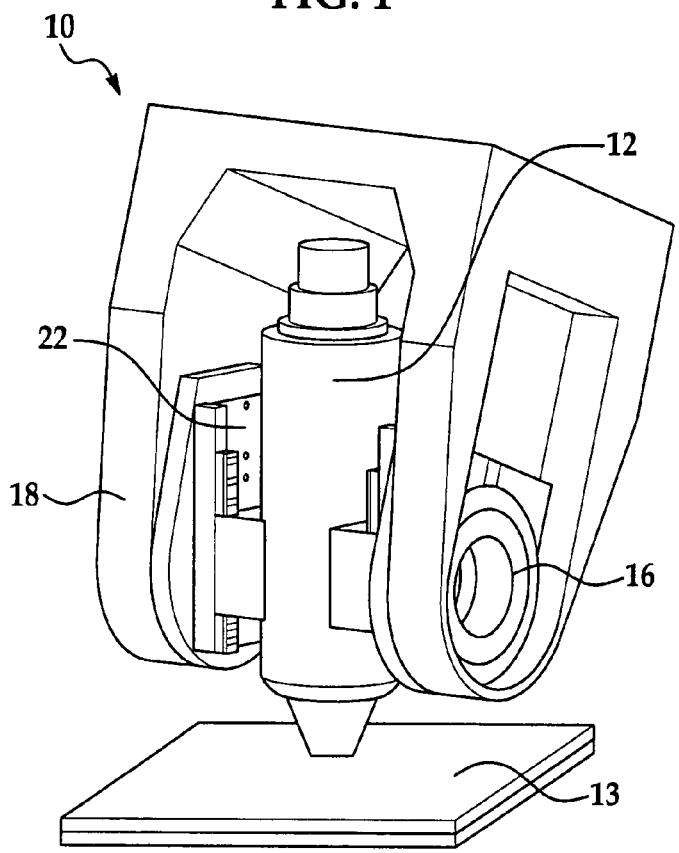
FIG. 1a is an isometric illustration of a friction-stir welding head assembly.
Figure 2:
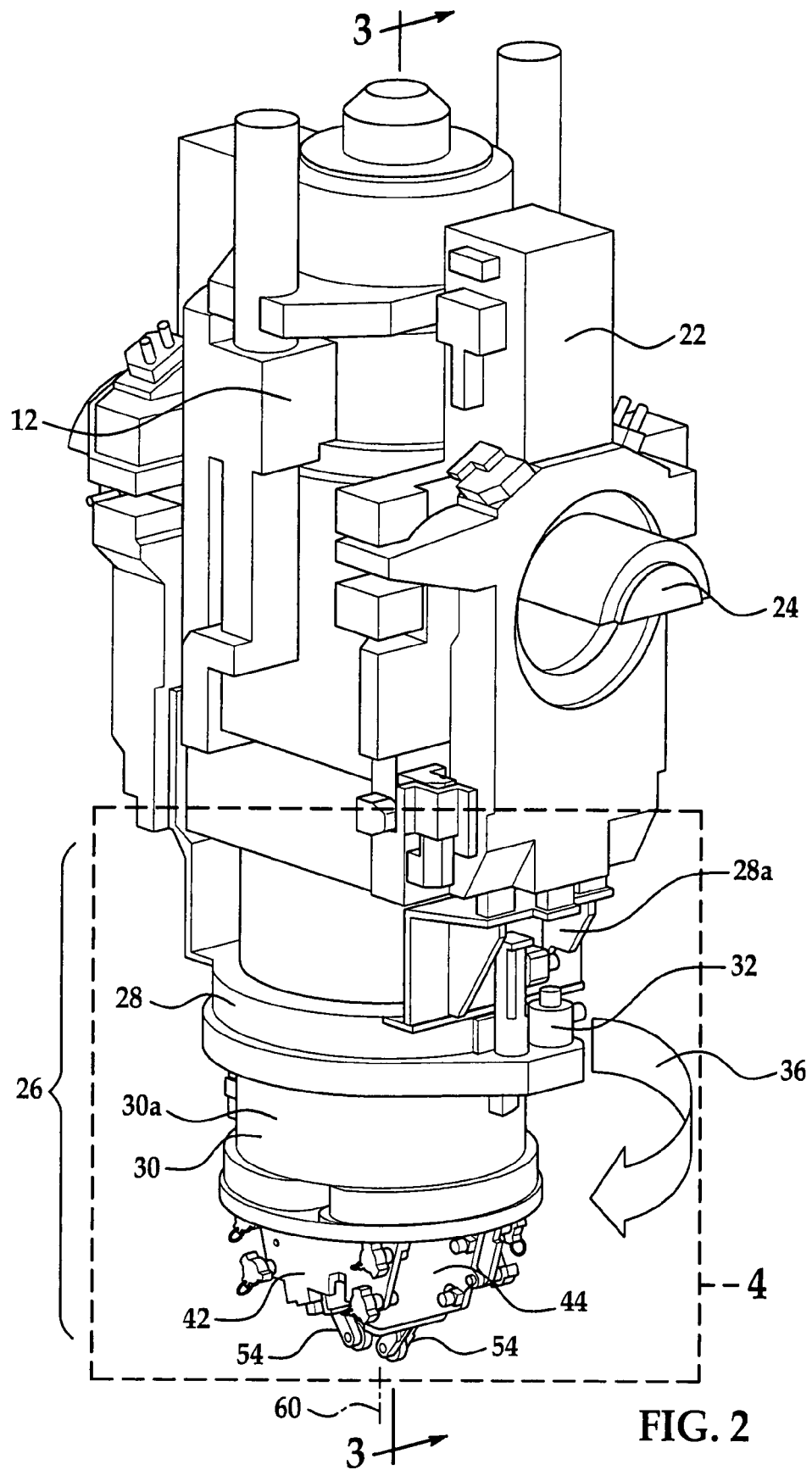
FIG. 2 is an isometric illustration of a friction-stir welding spindle housing and workpiece clamping apparatus according to one embodiment of the disclosure.
Figure 3:
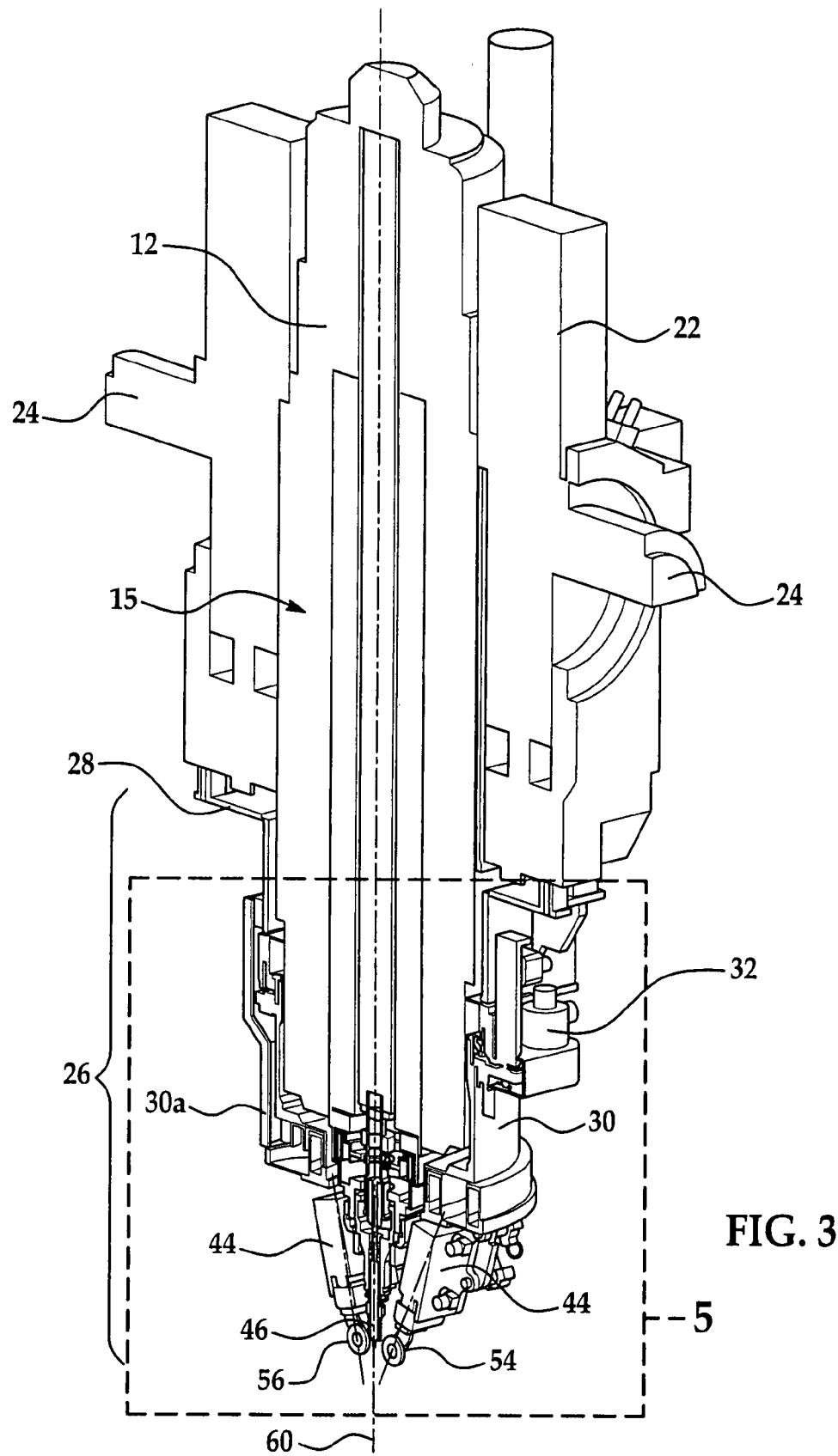
FIG. 3 is a sectional illustration taken along the line 3-3 in FIG. 2.
Figure 4:
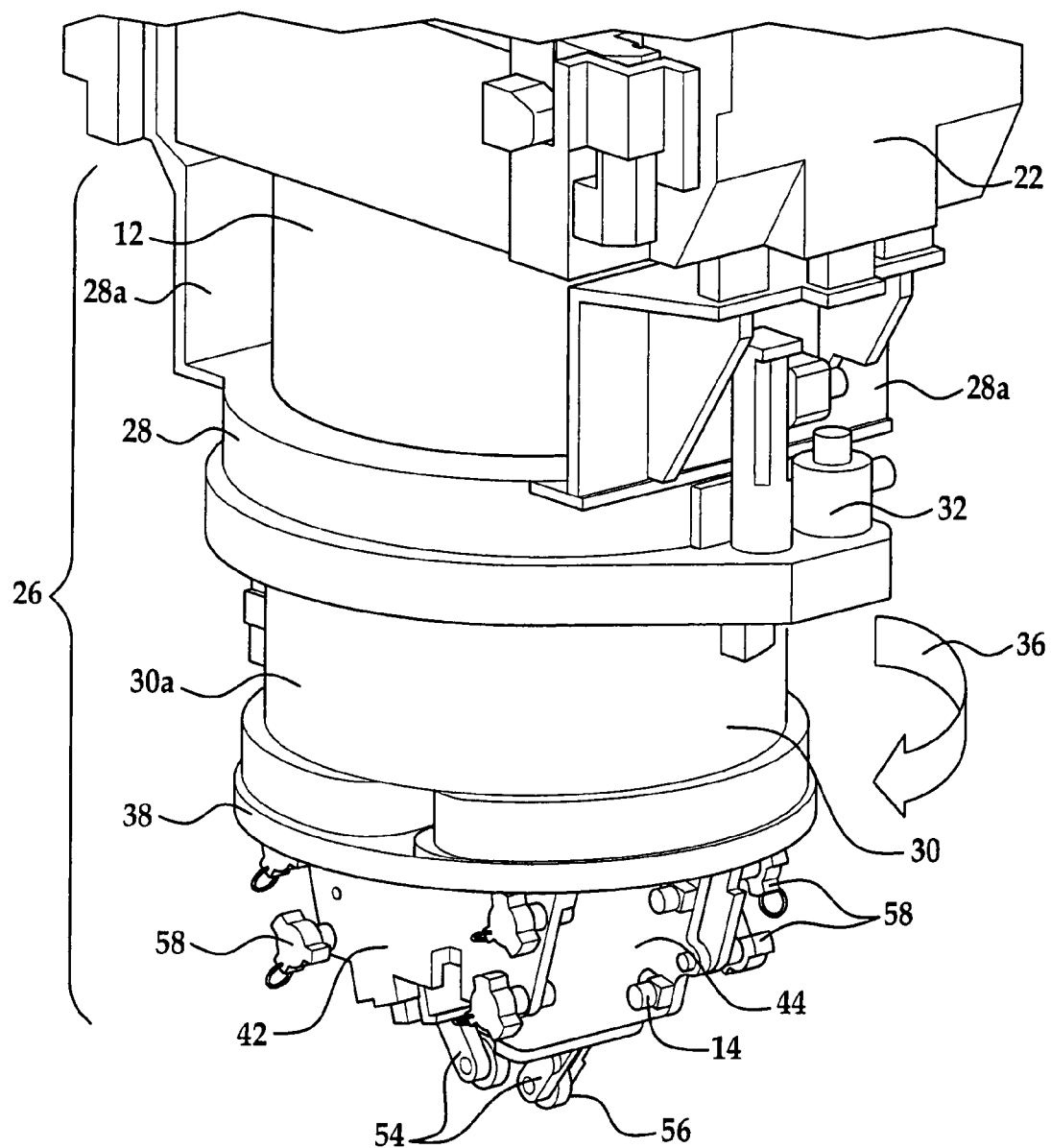
FIG. 4 is an enlarged illustration of the area designated as "FIG. 4" in FIG. 2.
Figure 5:
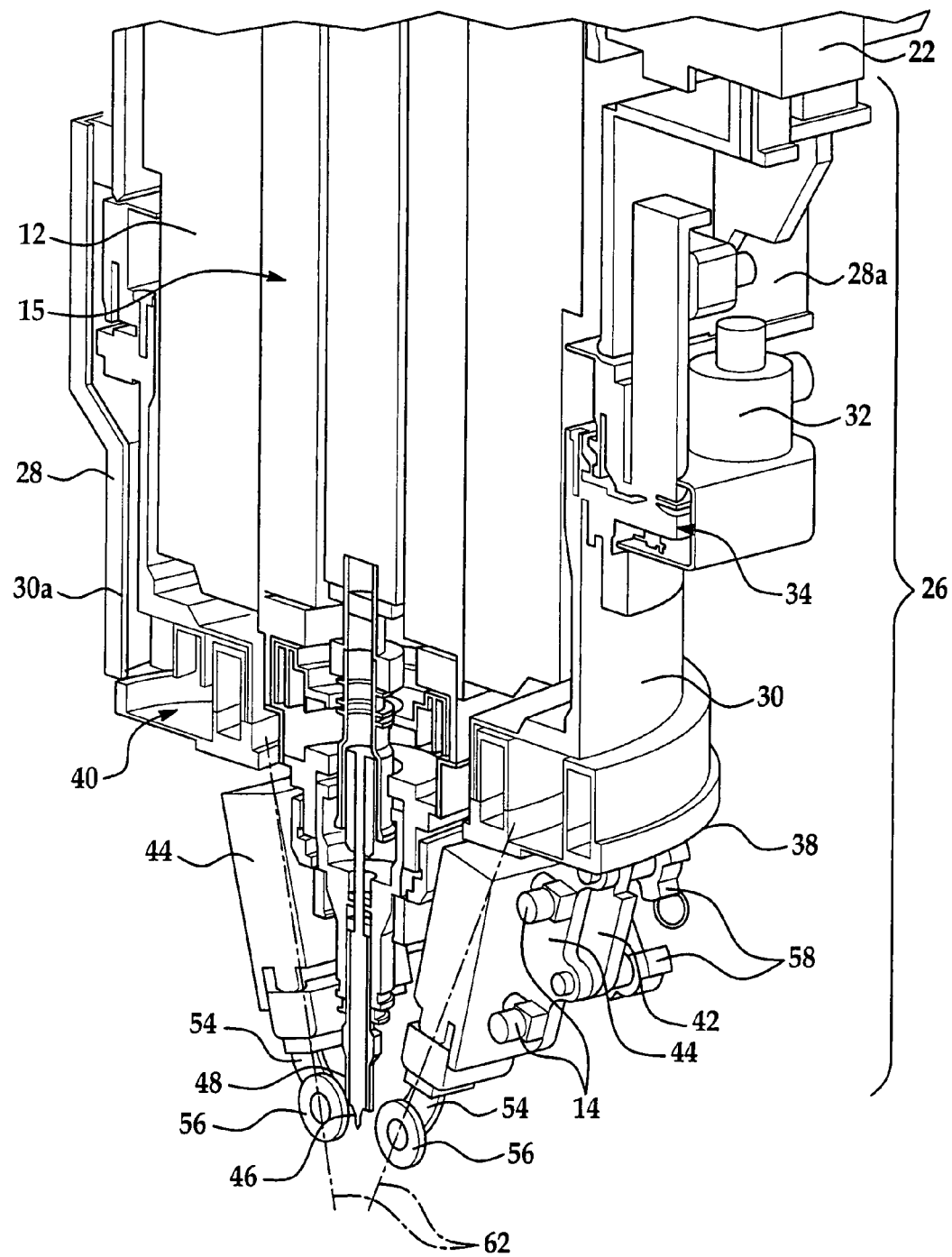
FIG. 5 is an enlarged, sectional illustration of the area designated as "FIG. 5" in FIG. 3.
Figure 6:
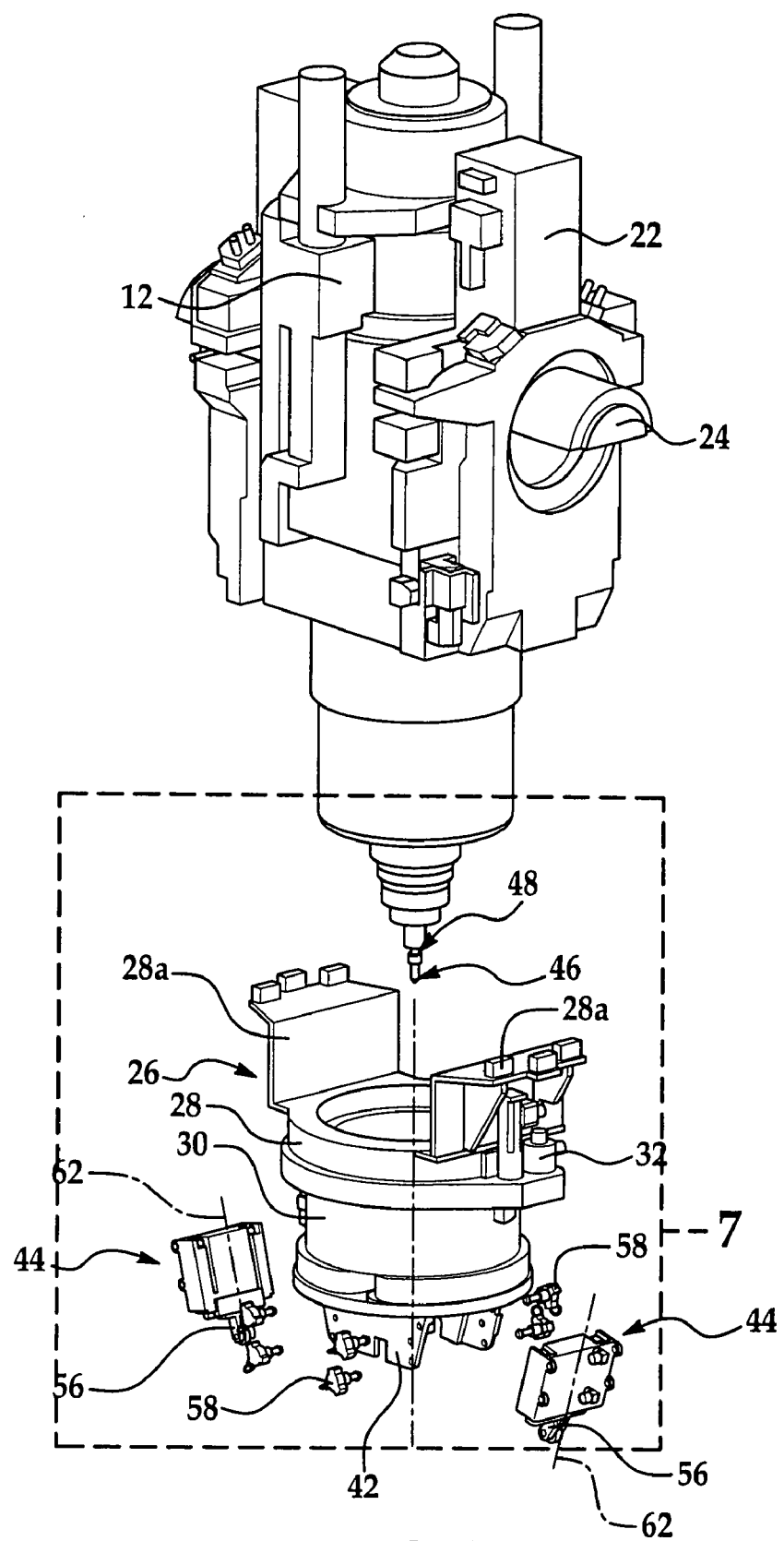
FIG. 6 is an exploded illustration of the FSW spindle and clamping apparatus shown in FIG. 2.

The spindle housing 12 may contain a dual spindle drive 15 configured to separately drive, advance and retract an FSW welding pin tool 46, and a shoulder tool 48 concentrically surrounding the tip of the welding pin tool 46. Mounting of the spindle housing 12 on the pivot 16 enables the angle of the spindle housing 12, and thus that of the tools 46, 48 to be adjusted with respect to a workpiece 13 (FIG. 1a). The spindle housing 12 may also be mounted on a track 22 (FIG. 1a), permitting the tools 46, 48 to be advanced toward and away from the workpiece 13. It should be noted here that while a FSW tool 46 and shoulder tool 48 have been illustrated, various other tools may be employed for performing operations on a workpiece 13 where clamping of the workpiece 13 may be necessary or desirable.

In order to clamp the workpiece 13 during an FSW welding operation, a clamping assembly generally indicated by the numeral 26 may be mounted on the spindle housing 12. The clamping assembly 26 broadly comprises a stationary portion 28, a rotatable portion 30, and a pair of opposing roller clamp packs 44 disposed on opposite sides of the FSW tool 46. The stationary portion 28 may surround the spindle housing 12 and includes a pair of brackets 28a respectively secured to the saddles 22. The rotatable portion 30 may include a generally cylindrical housing 30a mounted, as by bearings (not shown) on the stationary portion 28 for rotation about an axis 60 that may be independent of the axes of movement of the FSW tool 46, and shoulder tool 48. Housing 30a may be also connected to the stationary portion 28 by a rack and pinion gear assembly 34 which may be driven by a motor 32 mounted on the stationary portion 28. The motor 32 may comprise, for example, without limitation, an AC electric stepper motor including an incorporated encoder (not shown) that generates signals representing the rotational position of the housing 30a about the independent axis 60.

The lower portion of the housing 30a may include a circumferential conduit 40 which may house electrical lines and pneumatic control lines (not shown). A ring shaped, removable plate 38 may be mounted on the bottom of the housing 30a, as for example and without limitation, by screws to allow access to the conduit 40.

A pair of downwardly depending, spaced apart flanges 42 may be secured to the bottom of the plate 38, and provide a support for mounting the roller clamp packs 44. Ball lock pins 58 releasably attach the roller clamp packs 44 on the flanges 42. The ball lock pins 58 provide a quick release means of mounting the roller clamp packs 44 so that they may be easily removed and replaced with any of a variety of interchangeable clamping member configurations.

Figure 7:
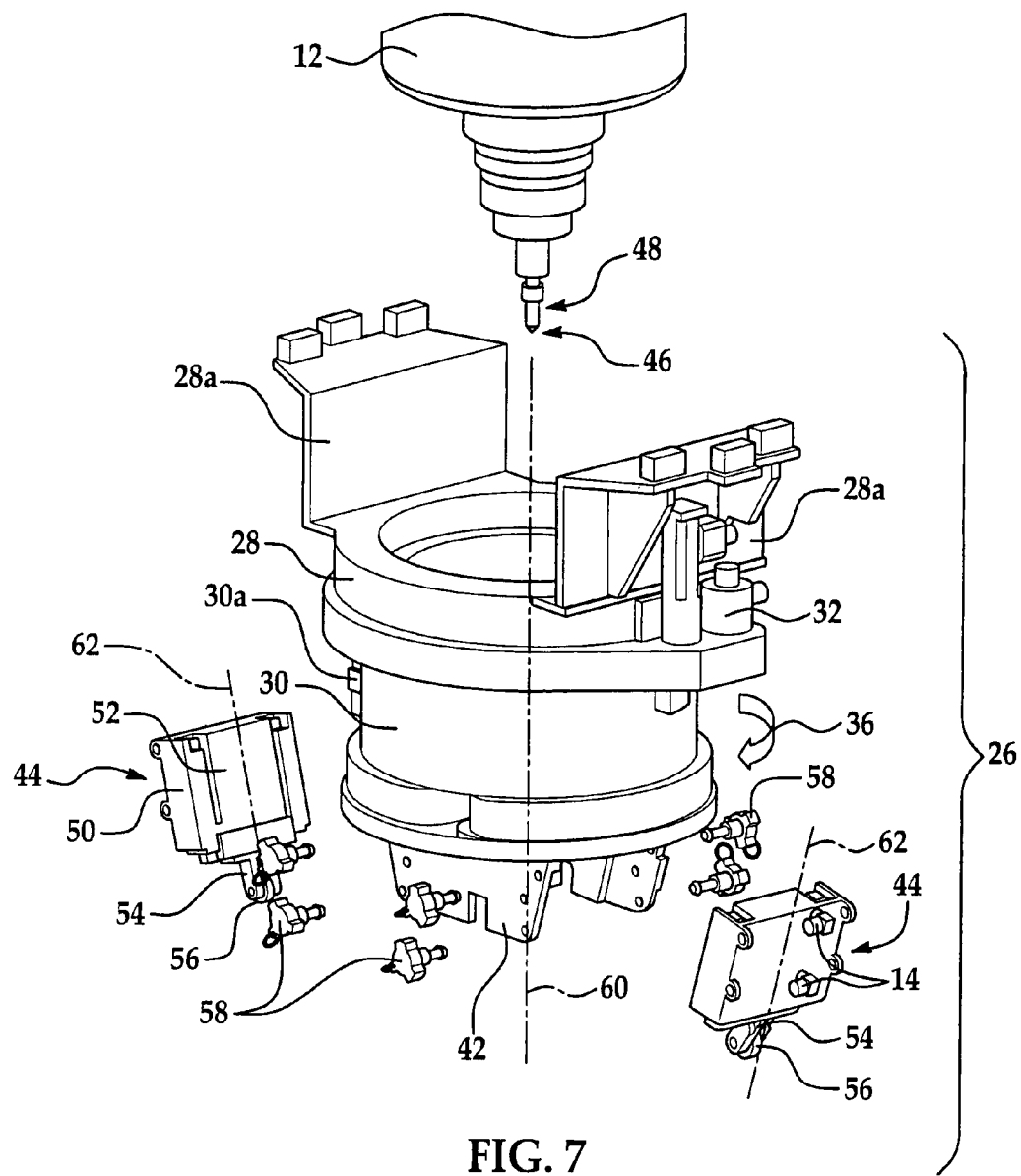
FIG. 7 is an enlarged illustration of the area designated as "FIG. 7" in FIG. 6.

As best seen in FIG. 7, each of the roller clamp packs 44 may include a generally rectangular housing 50 in which a slide member 52 is mounted for confined sliding movement within housing 50 along an axis 62 that is inclined with respect to the central axis 60 of the FSW tool 46. The movement of the slide member 52 along axis 62 may be independent of the axes of movement (not shown) of the FSW tool 46 and shoulder tool 48. A bifurcated arm 54 may be secured to the bottom of the slide member 52. A clamping roller 56 may be rotatably mounted on the bottom of each of the arms 54.

It should be noted here that although a pair of opposing roller clamp packs 44 have been illustrated, fewer or a greater number of the roller clamp packs 44 may be employed, depending on the operation to be performed on the workpiece 13. The housing 50 may include a pneumatic cylinder (not shown) which may be connected to drive the slide members 52 using pressurized air delivered from a source (not shown) to the roller clamp packs 54 via pneumatic connections 14 (see FIGS. 4, 5 and 7). The delivery of this pressurized air to the roller clamp packs 44 causes slide members 52 to move downwardly, thereby extending the arm 54 until the clamping roller 56 engages the workpiece 13 and applies a controlled amount of clamping pressure to the workpiece 13.

Figure 8:
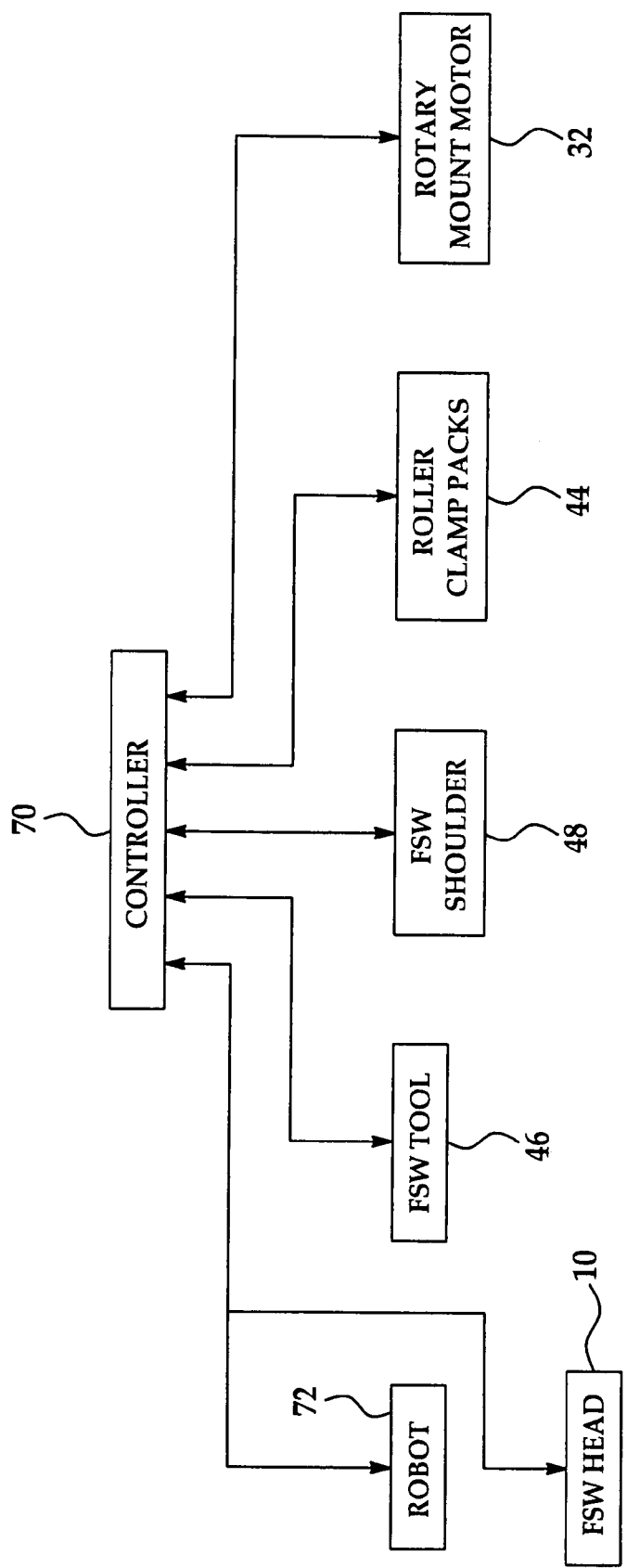
FIG. 8 is a broad block diagram illustrating a system for performing manufacturing operations on a workpiece.

Referring now also to FIG. 8, the operations performed on the workpiece 13 by the FSW head 10, including workpiece clamping, may be operated by a controller 70 which may comprise, without limitation, a programmed computer or PLC (programmable logic controller). Controller 70 may control a machine tool 72 that moves the FSW head 10. Controller 70 may also control the operation of the FSW tools 46, 48 which performs the FSW welding operation on the workpiece 13.

The controller 70 may further control a source of pressurized air, (not shown) as well as pneumatic logic (not shown). The pneumatic logic controls the roller clamp packs 48, by controlling the pressure of the air supplied to the cylinders in the roller clamp packs 44. The controlled air pressure regulates the amount of clamping pressure applied to the workpiece 13 by the clamping rollers 56. The controller 70 may send control signals to the motor 32, which may in turn control the rotational position of housing 30a, and thus the rotational position of the clamping rollers 56 on the workpiece 13. Controller 70 may coordinate the movement of the machine tool 72, the operation of the FSW tool 46 and shoulder tool 48, the rotational position of the clamping rollers 56 and the pressure applied to the workpiece 13 by the roller clamp packs 44.

Figure 9:
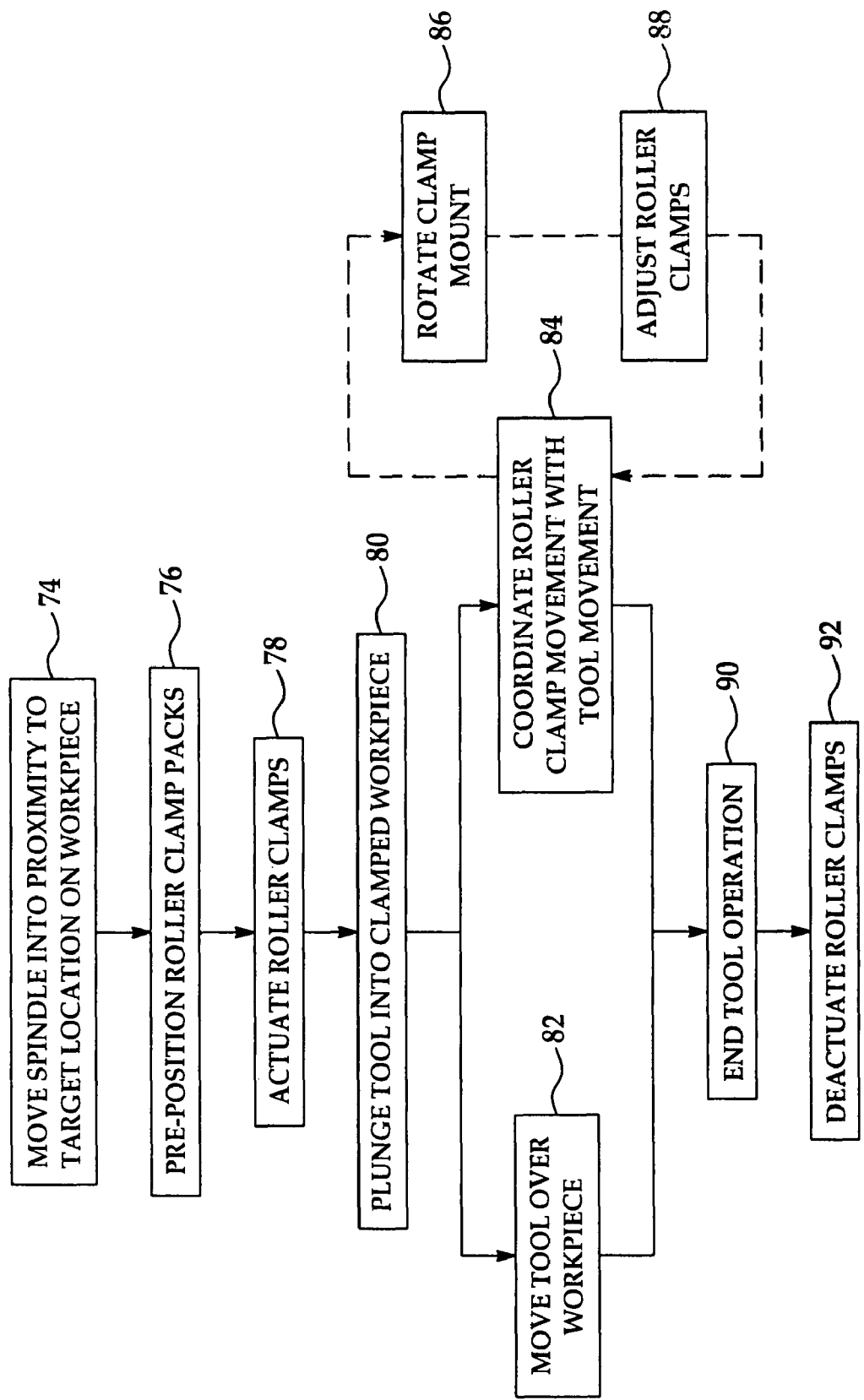
FIG. 9 is a block diagram illustrating a method for performing operations on a workpiece.

Attention is now also directed to FIG. 9 which illustrates the basic steps of a method for performing manufacturing operations on a workpiece 13. Beginning at step 74, controller 70 issues control signals that result in movement of the spindle housing 12 into proximity to a target location on a workplace 13. Next, at step 76, the controller 70 controls motor 32 to rotate the roller clamp packs 44 into position, following which the roller clamp packs 44 are actuated at 78, causing clamping rollers 56 to apply clamping force to the workpiece 13

With the workpiece 13 having been clamped, the FSW tool 46 is plunged into the workpiece 13 as shown at step 80. The FSW head 10 moves the tool 46 over the workpiece 13 as shown at step 82. As the tool 46 is being moved through a pre-programmed path, the controller 70 coordinates movement of the roller clamp packs 44 around the independent axis 60 with movement of the tool 46, as shown at step 84. In order to coordinate these movements, motor 32 is controlled to rotate the rotatable portion 30 of the clamping assembly 26, so that the clamping rollers 56 properly track movement of tool 46 and the contours of the workpiece 13. If required, the air pressure applied to the roller clamp packs 44 is adjusted at step 88 so that the desired level of clamping force is maintained regardless of the position of the tool 46 on the workpiece 13. When the FSW operation is ended at step 90, the roller clamp packs 44 may be deactuated at step 92, thereby unclamping the workpiece 13.

Figure 10:
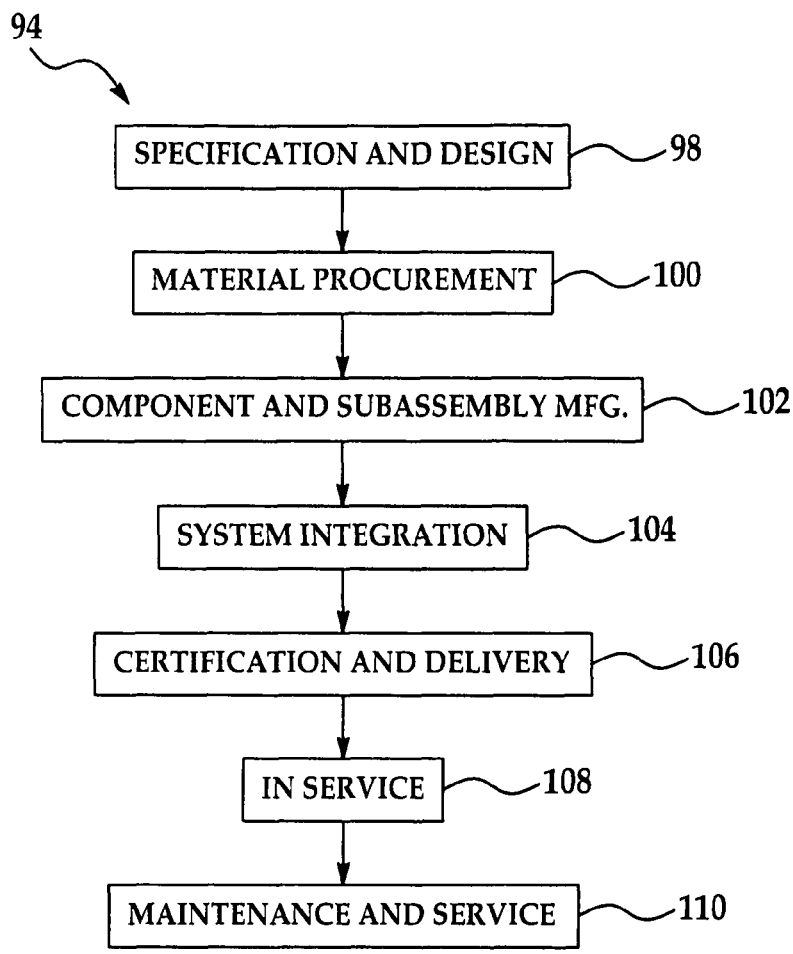
FIG. 10 is a flow diagram of aircraft production and service methodology.
Figure 11:
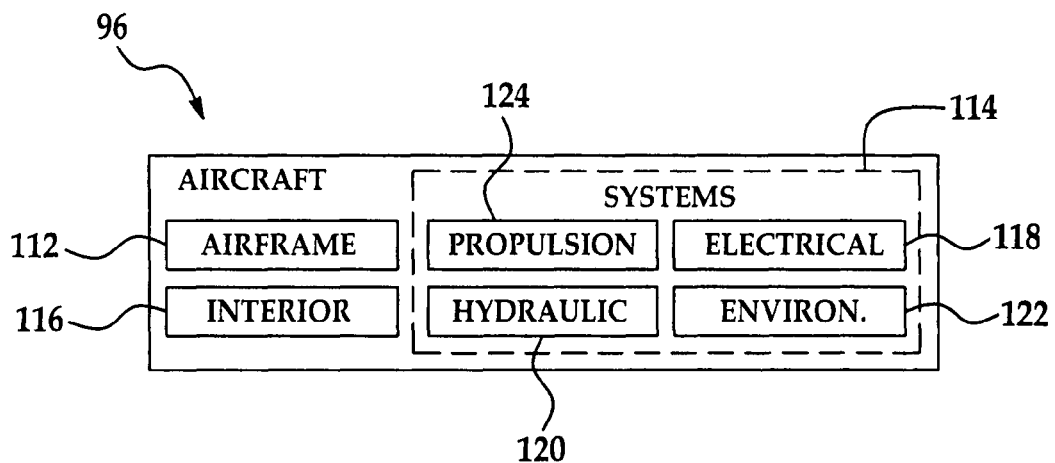
FIG. 11 is a block diagram of an aircraft.

Referring now to FIGS. 10 and 11, embodiments of the disclosure may be used in the context of an aircraft manufacturing and service method 94 as shown in FIG. 10 and an aircraft 96 as shown in FIG. 11. During pre-production, exemplary method 94 may include specification and design 98 of the aircraft 96 and material procurement 100. During production, component and subassembly manufacturing 102 and system integration 104 of the aircraft 96 takes place. Thereafter, the aircraft 96 may go through certification and delivery 106 in order to be placed in service 108. While in service by a customer, the aircraft 96 is scheduled for routine maintenance and service 110 (which may also include modification, reconfiguration, refurbishment, and so on).

Each of the processes of method 94 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 96 produced by exemplary method 94 may include an airframe 112 with a plurality of systems 114 and an interior 116. Examples of high-level systems 114 include one or more of a propulsion system 124, an electrical system 118, a hydraulic system 120, and an environmental system 122. Any number of other systems may be included. Although an aerospace example is shown, the principles of the invention may be applied to other industries, such as the automotive industry.

Apparatus and methods embodied herein may be employed during any one or more of the stages of the production and service method 94. For example, components or subassemblies corresponding to production process 102 may be fabricated or manufactured in a manner similar to components or subassemblies produced while the aircraft 96 is in service. Also, one or more apparatus embodiments, method embodiments, or a combination thereof may be utilized during the production stages 102 and 104, for example, by substantially expediting assembly of or reducing the cost of an aircraft 96. Similarly, one or more of apparatus embodiments, method embodiments, or a combination thereof may be utilized while the aircraft 96 is in service, for example and without limitation, to maintenance and service 110.

Although the embodiments of this disclosure have been described with respect to certain exemplary embodiments, it is to be understood that the specific embodiments are for purposes of illustration and not limitation, as other variations will occur to those of skill in the art.

What is claimed is:

1. Manufacturing apparatus, comprising:
   a tool support movable along multiple axes, said tool support having at least opposing sides;
   a tool mounted on the tool support for performing a manufacturing operation on a workpiece; and,
   a clamping assembly mounted on said at least opposing sides, said clamping assembly having an end, said clamping assembly moveable along at least a first axis independent of the movement of the tool, the clamping assembly including at least one clamping device mounted at said end of said clamp assembly and extendable from said end of the clamping assembly for applying clamping pressure to the workpiece; said at least one clamping device further comprises a roller clamp for engaging the workpiece and means for biasing the roller clamp against the workpiece.

2. The manufacturing apparatus of claim 1, wherein the clamping assembly includes a rotary drive on the tool support for rotating the at least one clamping device around the first axis.

3. The manufacturing apparatus of claim 2, wherein the rotary drive includes:
   a rotary mount including a first portion fixed to the tool support and a second portion rotatably coupled with the first portion, and
   a motor for rotating the second portion relative to the first portion.

4. The manufacturing apparatus of claim 1, wherein the biasing means includes a fluid driven motor.

5. The manufacturing apparatus of claim 1, wherein:
   the at least one clamping device includes a slide, and the roller clamp is mounted on the slide for sliding movement along a second axis toward and away from the workpiece.

6. The manufacturing apparatus of claim 1, wherein:
   the clamping assembly includes a mounting on the tool support, and
   the at least one clamping device includes a clamping pack and means for releasably coupling the clamping pack to the mounting.

7. The manufacturing apparatus of claim 6, wherein the clamping pack includes:
   a slide assembly, and
   a friction reducing clamping member mounted on the slide assembly for engaging the workpiece.

8. The manufacturing apparatus of claim 6, wherein the clamping pack includes:
   a slide assembly, and
   a friction reducing clamping member mounted on the slide assembly for engaging the workpiece.

9. The manufacturing apparatus of claim 1, wherein:
   the at least one clamping device includes a slide, and the roller clamp is mounted on the slide for sliding movement along a second axis toward and away from the workpiece.

10. The manufacturing apparatus of claim 1, wherein:
    the clamping assembly includes a mounting on the tool support, and the at least one clamping device includes a clamping pack and means for releasably coupling the clamping pack to the mounting.

11. Apparatus for performing operations on a workpiece, comprising:
   a tool assembly including a tool movable along multiple axes; and,
   a clamping assembly mounted on, the clamping assembly including at least one clamping device for applying clamping pressure to the workpiece, and
   means for mounting the at least one clamping device for movement along at least a first axis independent of the movement of the tool;
   the at least one clamping device having:
   a roller clamp for engaging the workpiece, and
   means for biasing the roller clamp against the workpiece.

12. The apparatus of claim 11, wherein:
   the tool assembly includes a spindle housing, and
   the mounting means includes a rotary mount for mounting the at least one clamping device on the spindle housing for rotation around the first axis.

13. The apparatus of claim 12, wherein the mounting means includes a slide assembly coupled with the rotary mount and mounting the clamping device for movement along a second axis.

14. The apparatus of claim 12, wherein the rotary mount includes:
   a stationary portion secured to the spindle housing,
   a rotatable portion coupled between the stationary portion an the clamping device, and
   a motorized drive for driving the second portion to rotate relative to the first portion.

15. The apparatus of claim 14, wherein the motorized drive includes:
   an electric motor, and
   a gear drive coupling the motor with the rotatable portion.

16. The manufacturing apparatus of claim 11, wherein the biasing means includes a pneumatic motor.

17. The manufacturing apparatus of claim 11, wherein:
   the mounting means includes a slide, and
   the roller clamp is mounted on the slide for sliding movement along a second axis toward and away from the workpiece.

18. The manufacturing apparatus of claim 11, wherein the at least one clamping device includes:
   a clamping pack, and
   a releasable connection for releasably securing the clamping pack on the mounting means.

19. The manufacturing apparatus of claim 18, wherein:
   the mounting means includes a slide assembly, and
   the clamping pack includes a friction reducing clamping member mounted on the slide assembly for engaging the workpiece.

20. Manufacturing apparatus, comprising:
   a tool support movable along multiple axes;
   a tool mounted on the tool support for performing a manufacturing operation on a workpiece; and,
   a clamping assembly mounted on the tool support for movement along at least a first axis independent of the movement of the tool, the clamping assembly including at least one clamping device for applying clamping pressure to the workpiece;
   the at least one clamping device having:
   a roller clamp for engaging the workpiece, and
   means for biasing the roller clamp against the workpiece.

21. The manufacturing apparatus of claim 20, wherein the clamping assembly includes a rotary drive on the tool support for rotating the at least one clamping device around the first axis.

22. The manufacturing apparatus of claim 20, wherein the tool comprises a friction stir welding (FSW) tool.

* * * * *